(12) United States Patent
Ito

(10) Patent No.: US 9,735,622 B2
(45) Date of Patent: Aug. 15, 2017

(54) ISOLATED SIGNAL TRANSMISSION APPARATUS

(71) Applicant: YOKOGAWA ELECTRIC CORPORATION, Musashino-shi, Tokyo (JP)

(72) Inventor: Ken Ito, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 360 days.

(21) Appl. No.: 14/506,788

(22) Filed: Oct. 6, 2014

(65) Prior Publication Data

US 2015/0097421 A1 Apr. 9, 2015

(30) Foreign Application Priority Data

Oct. 7, 2013 (JP) ................. 2013-210143

(51) Int. Cl.
| | |
|---|---|
| *H02J 1/00* | (2006.01) |
| *H02J 3/00* | (2006.01) |
| *H04B 3/54* | (2006.01) |
| *H02J 13/00* | (2006.01) |
| *G05B 19/042* | (2006.01) |

(52) U.S. Cl.
CPC .......... *H02J 13/0003* (2013.01); *H04B 3/548* (2013.01); *G05B 19/0423* (2013.01); *G05B 2219/25132* (2013.01); *G05B 2219/34423* (2013.01); *H04B 2203/547* (2013.01);
(Continued)

(58) Field of Classification Search
CPC .... H04B 3/54; H04B 3/548; H04B 2203/547; H04B 2203/5454; H04B 3/542; H04B 2203/5491; H04B 2203/5458; H04B 2203/5408; H04B 3/56; H04B 2203/5445; H04B 2203/5483; H04B 2203/5416; H04B 2203/545
See application file for complete search history.

(56) References Cited

U.S. PATENT DOCUMENTS 7,423,588 B1* 9/2008 Rauch .................. H01Q 3/26
342/372
2005/0021213 A1* 1/2005 Miller .................. F02C 9/263
701/100
(Continued)

FOREIGN PATENT DOCUMENTS

EP 2360805 A1 8/2011
JP 62-125706 A 6/1987
(Continued)

OTHER PUBLICATIONS

Communication issued on Feb. 12, 2015 by the European Patent Office in related application No. 14187564.1.

*Primary Examiner* — Jared Fureman
*Assistant Examiner* — Esayas Yeshaw
(74) *Attorney, Agent, or Firm* — Sughrue Mion, PLLC

(57) ABSTRACT

An isolated signal transmission apparatus isolatingly transmits, from a control-side apparatus to a control target apparatus, an electric signal obtained by superimposing a communication signal on a direct-current signal. The apparatus includes a lower limiter circuit configured to output, to the control target apparatus, a direct-current signal, whose value is a predetermined lower limit value, if a value of the direct-current signal from the control-side apparatus is less than the predetermined lower limit value.

5 Claims, 12 Drawing Sheets

(52) U.S. Cl.
CPC ............... *H04B 2203/5416* (2013.01); *H04B 2203/5483* (2013.01)

(56) References Cited

U.S. PATENT DOCUMENTS

| | | | | |
|---|---|---|---|---|
| 2006/0152082 A1* | 7/2006 | Gruber | ............... | H02M 1/08 307/4 |
| 2007/0285057 A1* | 12/2007 | Yano | ............... | B60L 3/0046 320/116 |
| 2010/0091523 A1* | 4/2010 | Uno | ............... | H02M 1/4225 363/20 |
| 2010/0201188 A1* | 8/2010 | Robbins | ............ | H04L 12/10 307/1 |
| 2010/0213759 A1* | 8/2010 | Covaro | ............ | H04B 3/542 307/1 |
| 2010/0296560 A1* | 11/2010 | Sadan | ............... | H04B 3/56 375/222 |
| 2011/0305043 A1* | 12/2011 | Matsumoto | ....... | H02M 3/33592 363/21.01 |
| 2012/0243271 A1* | 9/2012 | Berghegger | ...... | H02M 3/33507 363/21.15 |
| 2013/0076129 A1* | 3/2013 | Kunimitsu | .......... | B60L 11/1859 307/10.7 |
| 2014/0055676 A1* | 2/2014 | Matsumoto | ........... | H03M 3/458 348/572 |
| 2014/0139014 A1* | 5/2014 | Sontag | ............ | H04L 12/40045 307/1 |

FOREIGN PATENT DOCUMENTS

| | | |
|---|---|---|
| JP | 2011-239362 A | 11/2011 |
| WO | 2005040992 A2 | 5/2005 |

\* cited by examiner

ISOLATED SIGNAL TRANSMISSION APPARATUS

CROSS-REFERENCE TO RELATED APPLICATION(S)

The present application claims the benefit of priority of Japanese Patent Application No. 2013-210143 filed on Oct. 7, 2013. The disclosures of the application are incorporated herein by reference.

BACKGROUND

Technical Field

The present invention relates to an isolated signal transmission apparatus for isolatingly transmitting, from a control-side apparatus to a control target apparatus, an electric signal obtained by superimposing a communication signal on a DC (direct-current) current signal and, more particularly, to an isolated signal transmission apparatus for enabling a control target apparatus to operate even during failure of the control side apparatus.

Related Art

In a plant, an operation signal from a host device, such as a distributed control system (DCS), is input to a field device that performs a control operation, such as a valve manipulation. Generally, a DC current signal of 4 to 20 milliamperes (mA) is used as an operation signal. An isolator and a distributer are known as an isolated signal transmission apparatus that isolatingly transmits a DC current signal.

In recent years, what is called smart communication has widely been performed, in which a DC current signal is transmitted by superimposing a digital communication signal thereon. An isolated signal transmission apparatus dealing with the smart communication is enabled to isolatingly transmit a communication signal, in addition to a DC current signal of 4 to 20 mA.

FIG. 10 is a block diagram illustrating an example of application of an isolated signal transmission apparatus that performs isolated transmission of a signal in the smart communication. This figure illustrates an example of an isolated signal transmission apparatus that isolatingly transmits, to a valve positioner serving as a control target apparatus from a DCS 410 serving as a control-side apparatus, an electric signal obtained by superimposing a communication signal on a DC current signal of 4 to 20 mA. An output isolator 500 is used as the isolated signal transmission apparatus. In the output isolator 500, a side, to which the DCS 410 is connected and to which an electric signal is input, is referred to as a system side, while a side, to which the valve positioner 420 is connected and from which an electric signal is output, is referred to as a field side.

The valve positioner 420 also uses the DC current signal of 4 to 20 mA as an operating power source, and manipulates the degree of opening of a valve 430 according to an electric signal isolatingly transmitted by the output isolator 500.

FIG. 11 is a block diagram illustrating a configuration of a related-art output isolator 500. As illustrated in this figure, the output isolator 500 separates a communication signal and a DC current signal from an electric signal input to an input terminal of the system side by a capacitor Ci, and isolatingly transmits the communication signal to the field side by a communication signal isolating circuit 540. An isolation transformer, an isolation amplifier, or the like is used as the communication signal isolating circuit 540. Incidentally, the transmission using the communication signal is performed bi-directionally. Thus, a capacitor Co is also provided in the field side.

The DC current signal of 4 to 20 mA is converted by a direct-current signal input circuit 550 into, e.g., DC (direct-current) voltage signal of 1 to 5 volts (V) that is isolatingly transmitted to the field side by a direct-current signal isolating circuit 520. A photocoupler or the like is used as the direct-current signal isolating circuit 520. Then, the DC voltage signal of 1 to 5 V is converted by a direct-current signal output circuit 530 into a DC current signal of 4 to 20 mA.

The communication signal and the DC current signal of 4 to 20 mA, which are isolatingly transmitted to the field side, are superimposed on each other again and output from an output terminal.

PRIOR ART DOCUMENT

Patent Document

[Patent Document 1] JP-A-2011-239362

If the DCS 410 malfunctions, it is necessary to control the valve positioned 420 appropriately to thereby shut down the entire plant safely.

If the degree of failure of the DCS 410 is such that the DCS 410 cannot output a communication signal while the DCS 410 can output a DC current at which the valve positioner 420 can operate, the valve positioner 420 can appropriately be controlled by connecting a communication device 440, such as a handheld information terminal device, between the output isolator 500 and the valve positioner 420, as illustrated in FIG. 12 and then transmitting a communication signal from the communication device 440 to the valve positioner 420. In this case, a DC current necessary for an operation of the valve positioner 420 is supplied from the DCS 410.

However, if the degree of failure of the DCS 410 is such that the DCS 410 cannot output a DC current, the valve positioner 420 cannot be operated with the configuration illustrated in FIG. 12. Therefore, for example, as illustrated in FIG. 13, a manual operation device 450 outputting a DC current signal of 4 to 20 mA is forced to be connected to a system side of the output isolator 500 thereby to control the valve positioner 420 by an analog signal. Thus, measures for safely shutting down the plant are extensive and troublesome.

SUMMARY

Exemplary embodiments of the invention provide an isolated signal transmission apparatus that causes a control-side apparatus to isolatingly transmit, to a control target apparatus, an electric signal obtained by superimposing a direct-current signal and a communication signal on each other, in which even if the control-side apparatus malfunctions, the control target apparatus is enabled to operate.

An isolated signal transmission apparatus configured to isolatingly transmitting, from a control-side apparatus to a control target apparatus, an electric signal obtained by superimposing a communication signal on a direct-current signal, according to an exemplary embodiment, comprises:

a lower limiter circuit configured to output, to the control target apparatus, a direct-current signal, whose value is a predetermined lower limit value, if a value of the direct-current signal from the control-side apparatus is less than the predetermined lower limit value.

The control target apparatus may use the direct-current signal as a signal that supplies operating power source, and the lower limit value may be a minimum operating value of the control target apparatus.

The direct-current signal may be a DC current signal of 4 to 20 mA.

The lower limit limiter circuit may have an upper limit function of outputting a direct-current signal whose value is the predetermined upper limit value if a value of the direct-current signal from the control-side apparatus excesses a predetermined upper limit value.

According to the invention, in an isolated signal transmission apparatus that causes a control-side apparatus to isolatingly transmit, to a control target apparatus, an electric signal obtained by superimposing a direct-current signal and a communication signal on each other, even if the control-side apparatus malfunctions, the control target apparatus is enabled to operate.

DETAILED DESCRIPTION

Figure 1:
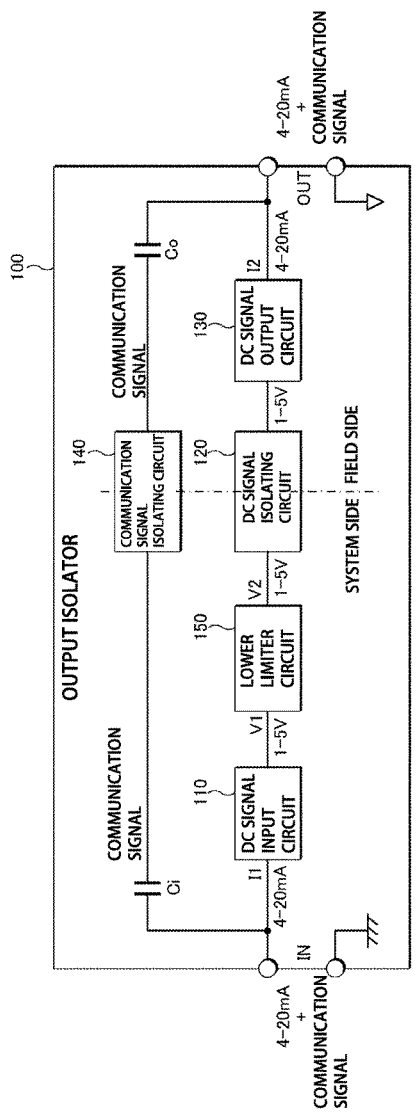
FIG. 1 is a block diagram illustrating a configuration of an output isolator according to an embodiment.

An embodiment of the invention is described hereinafter with reference to the accompanying-drawings. This embodiment describes a case of applying an isolated signal transmission apparatus according to the invention to an output isolator. FIG. 1 is a block diagram illustrating a configuration of an output isolator 100 according to this embodiment.

The output isolator 100 receives an electric signal obtained by superimposing a DC current signal of 4 to 20 mA and a communication signal on each other from a control-side apparatus such as a DCS, and isolatingly transmits the electric signal to a control target apparatus such as a valve positioner or an electropneumatic transducer.

As illustrated in this figure, the output isolator 100 includes a direct-current signal input circuit 110, a direct-current signal isolating circuit 120, a direct-current signal output circuit 130, a communication signal isolating circuit 140, a lower limiter circuit 150, and a system-side capacitor Ci and a field-side capacitor Co both of which are operative to separate a direct-current signal and a communication signal from an electric signal.

The direct-current signal input circuit 110 converts a DC current signal I1 of 4 to 20 mA into, e.g., a DC voltage signal V1 of 1 to 5 V. The direct-current signal isolating circuit 120 isolatingly transmits a DC voltage signal V2 from the system side to the field side. The direct-current signal output circuit 130 converts, e.g., a DC voltage signal V2 of 1 to 5 V to a DC current signal I2 of 4 to 20 mA. The communication signal isolating circuit 140 transmits a communication signal isolatingly and bi-directionally.

The lower limiter circuit 150 controls the voltage V2 so as to be output as follows. That is, if the value of the input voltage V1 is higher than or equal to a predetermined lower limit voltage value Vmin, the lower limiter circuit 150 outputs the voltage value of the input voltage V1 without change as the output voltage V2, and if the input voltage V1 is lower than the predetermined lower limit voltage value Vmin, the lower limiter circuit 150 outputs a predetermined lower limit voltage value Vmin as the output voltage V2.

Figure 2A:
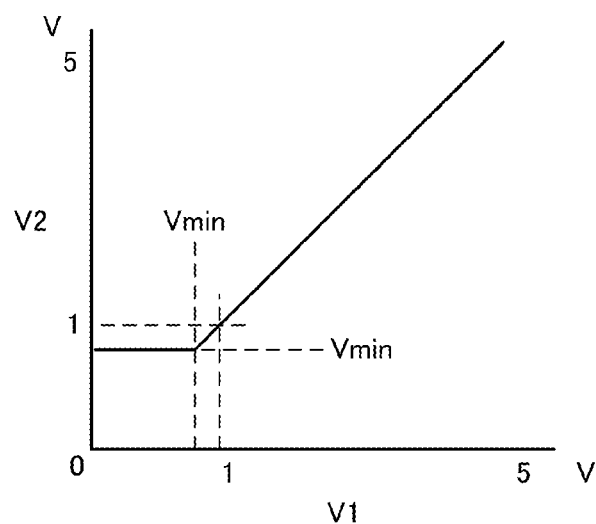
FIG. 2A is a diagram illustrating characteristics of an input voltage V1 and an output voltage V2 of a lower limiter circuit.
Figure 2B:
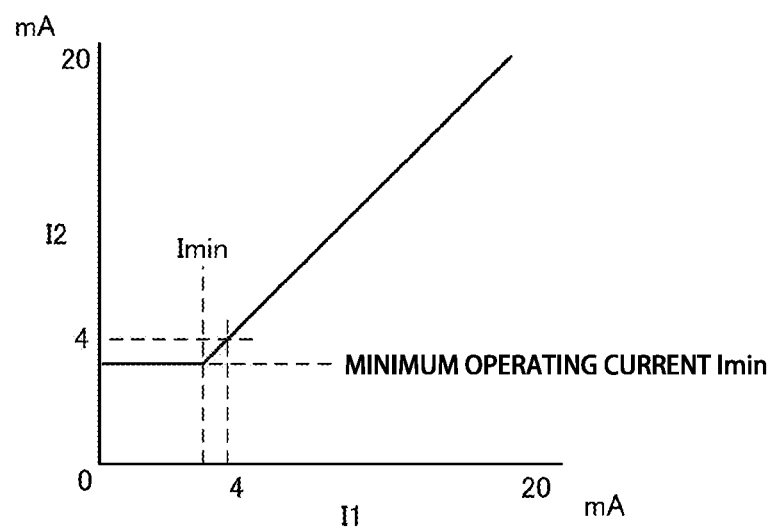
FIG. 2B is a diagram illustrating characteristics of an input current I1 and an output current I2 of the output isolator.

Hereinafter, the predetermined lower limit voltage value Vmin is described. Generally, a minimum operating current value Imin, e.g., 3.8 mA, is set for field devices, such as a valve positioner, serving as control target apparatuses. The lower limiter circuit 150 is operative to set, as the lower limit voltage value Vmin, the value of the voltage V2 when the value of the DC current signal I2 output by the direct-current signal output circuit 130 is Imin. Thus, the relationship between the input voltage V1 and the output voltage V2 of the lower limiter circuit 150 has such characteristics as illustrated in FIG. 2A. Accordingly, the relationship between the input DC current signal I1 and the output DC current signal I2 of the output isolator 100 has such characteristics as illustrated in FIG. 2B.

However, it is sufficient that the lower limit voltage value Vmin is higher than or equal to the value of the voltage V2 at which the value of the DC current signal I2 output by the direct-current signal output circuit 130 is Imin and has substantially no influence upon the DC current signal of 4 to 20 mA. Thus, a DC current signal, whose value is at least, i.e., larger than or equal to the minimum operating current value Imin, is output from the output isolator 100.

The output isolator 100 of this configuration separates a communication signal and a DC current signal by the capacitor Ci from an electric signal input to the input terminal of the system side, and isolatingly transmits the communication signal to the field side by the communication signal isolating circuit 140. The DC current signal of 4 to 20 mA is converted by the direct-current signal input circuit 110 into, e.g., a DC voltage signal of 1 to 5 V, and isolatingly transmitted to the field side by the direct-current signal isolating circuit 120 through the lower limiter circuit 150. Then, the DC voltage signal of 1 to 5 V is converted by the direct-current signal output circuit 130 into a DC current signal of 4 to 20 mA. The communication signal and the DC current signal of 4 to 20 mA, which are isolatingly transmitted to the field side, are superimposed on each other again and output from an output terminal.

Figure 3:
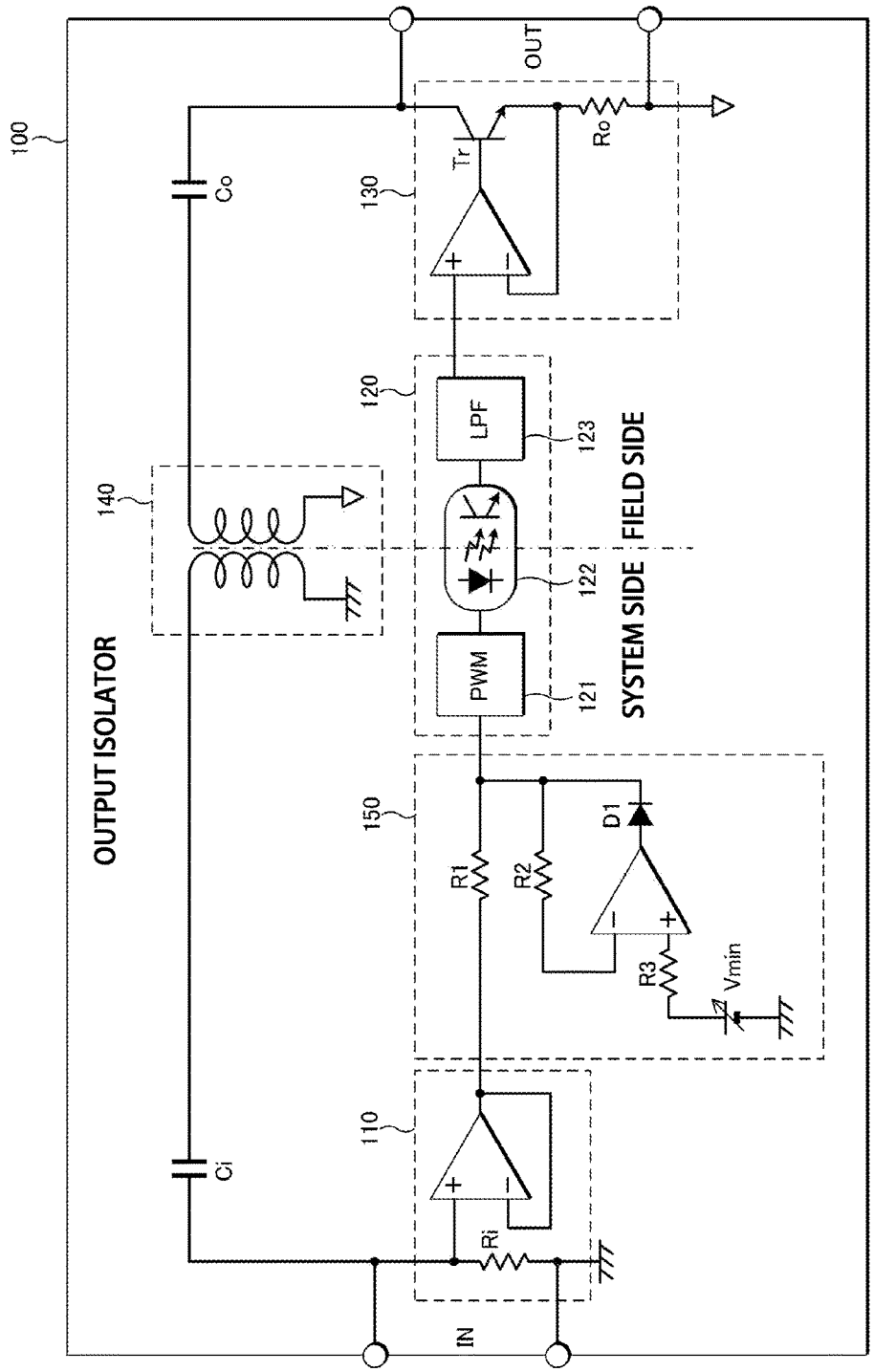
FIG. 3 is a diagram illustrating an example of a practical circuit configuration of each block of the output isolator according to this embodiment.

FIG. 3 is a diagram illustrating an example of a practical circuit configuration of each block of the output isolator 100 according to this embodiment. However, the output isolator 100 is not limited to the example whose circuit configuration is illustrated in this figure, and can be configured by various circuits implementing each block.

In the example illustrated in this figure, the direct-current signal input circuit 110 is configured by a resistor Ri converting the DC current signal I1 into the DC voltage signal V1, and a buffer. The direct-current signal isolating circuit 120 is configured by a pulse width modulator (PWM) 121 converting the DC voltage signal V2 into a pulse width signal, a photocoupler 122 optically transmitting a pulse signal, and a low-pass filter (LPF) 123 converting a pulse signal into a DC voltage signal V2. The direct-current signal output circuit 130 configures a constant current circuit using a transistor Tr, a resistor Ro, and an operational amplifier so as to convert the DC voltage signal V2 into a DC current signal I2. Incidentally, the communication signal isolating circuit 140 is configured using an isolation transformer.

A general circuit is employed as the lower limiter circuit 150, which uses a power-supply voltage source, an operational amplifier, resistors R1, R2, and R3, and a diode D1. The lower limiter circuit 150 sets a power-supply voltage at Vmin so that a lower limit voltage value is Vmin. Incidentally, it is desirable that the lower limit voltage value Vmin can be changed according to the minimum operating current value Imin of a control target apparatus.

Figure 4:
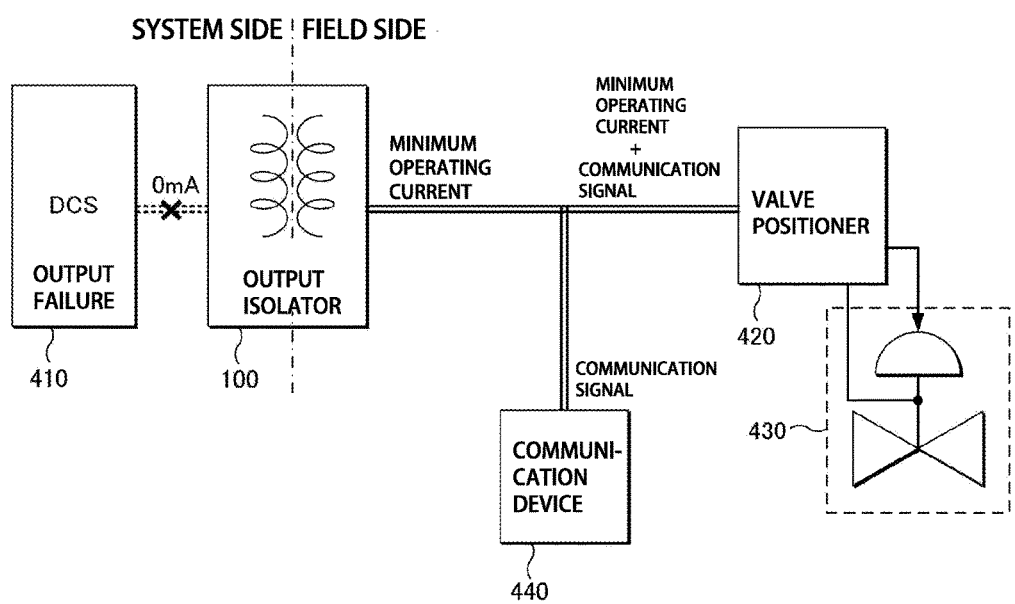
FIG. 4 is a diagram illustrating a configuration of operating a valve positioner using a communication device when output of DCS malfunctions.

The output isolator 100 according to this embodiment can supply a minimum operating current of the valve positioner 420 to the valve positioner 420 even when the DCS 410 malfunctions and cannot supply the minimum operating current to the valve positioner 420 as shown in FIG. 4. Accordingly, the valve positioner 420 can be operated.

Thus, the valve positioner 420 can appropriately be controlled by connecting a communication device 440, such as a handled information terminal apparatus, between the output isolator 100 and the valve positioner 420 utilizing an existing wiring and by then causing the communication device 440 to transmit a communication signal to the valve positioner 420. Consequently, a plant can safely be shut down at low cost without performing a troublesome operation using a manual operation device.

Figure 5:
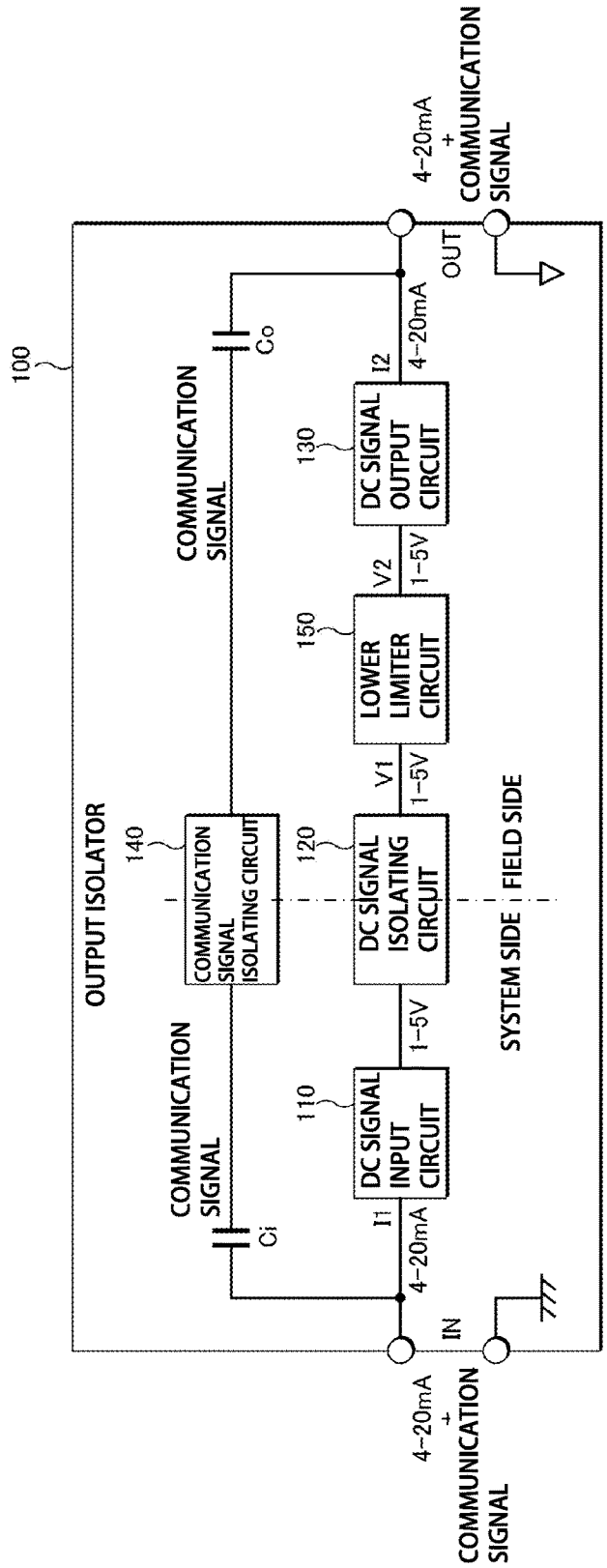
FIG. 5 is a block diagram illustrating a modified embodiment according to the invention.

Incidentally, the invention is not limited to the above embodiment. Various modifications can be made. For example, although the lower limiter circuit 150 is provided on the system side in the above embodiment, the lower limiter circuit 150 may be provided on the field side, as illustrated in FIG. 5. In this case, the lower limiter circuit 150 is provided between the direct-current signal isolating circuit 120 and the direct-current signal output circuit 130 so that the lower limit value Vmin is output to the direct-current signal output circuit 130 if the value of the output voltage V1 of the direct-current signal isolating circuit 120 is less than the lower limit voltage value Vmin.

Further, although the lower limiter circuit 150 outputting the lower limit voltage value Vmin is used in the above embodiment, a lower limiter circuit employing a minimum operating current value Imin as the lower limit current value may be used.

Figure 6:
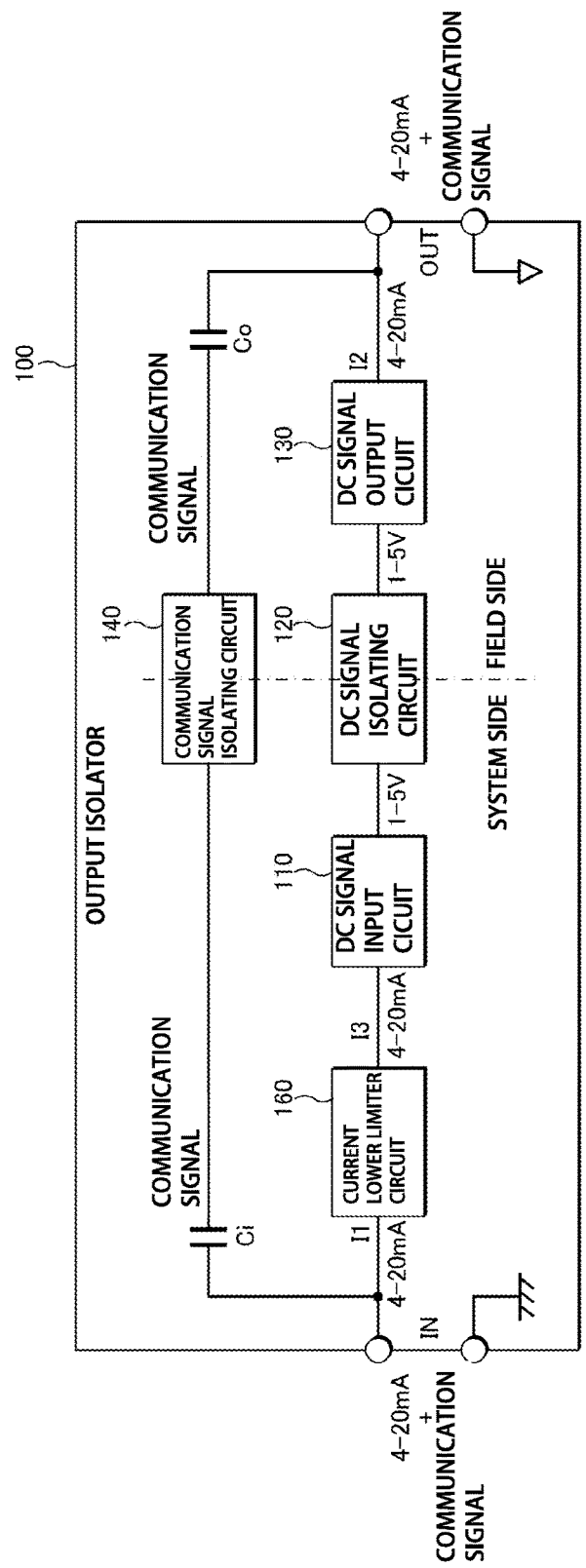
FIG. 6 is a block diagram illustrating a modified embodiment using a current lower limiter circuit according to the invention.
Figure 7:
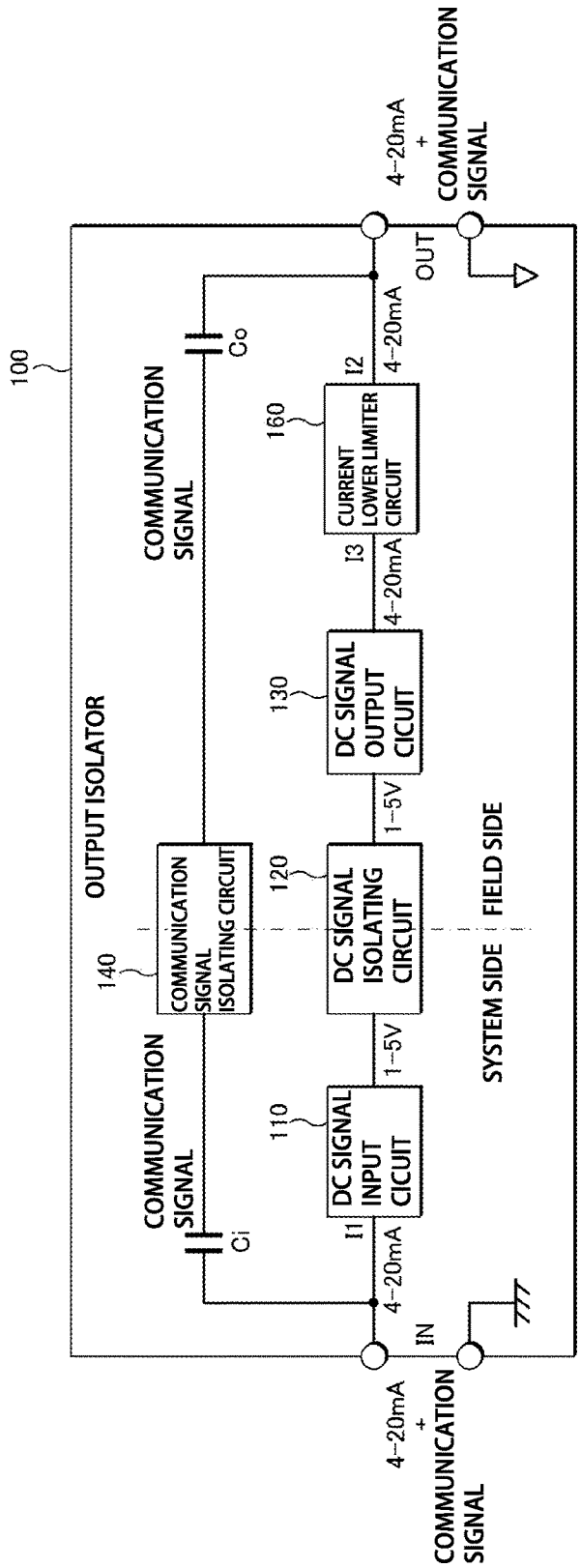
FIG. 7 is a block diagram illustrating a modified embodiment using a current lower limiter circuit according to the invention.

In this case, for example, as illustrated in FIG. 6, a current lower limiter circuit 160 is arranged at the preceding stage of the direct-current signal input circuit 110 on the system side. Alternatively, as illustrated in FIG. 7, a current lower limiter circuit 160 is arranged at the subsequent stage of the direct-current signal output circuit 130 on the field side.

Figure 8:
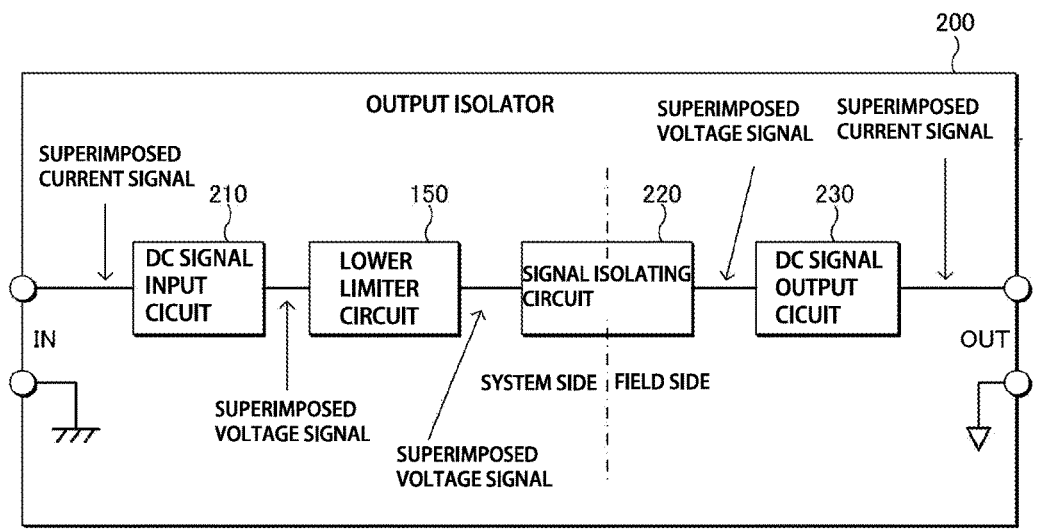
FIG. 8 is a block diagram illustrating a modified embodiment using a single path used in common as both of the path for a DC current signal and the path for a communication signal according to the invention.

Moreover, although a path for a direct-current signal is separated from a path for a communication signal in the output isolator 100 in the above embodiment, a single path may be used in common as both of the path for a direct-current signal and the path for a communication signal, as illustrated in FIG. 8. As illustrated in this figure, an output isolator 200 converts a superimposed current signal obtained by superimposing a DC current signal and a communication signal on each other into a superimposed voltage signal at a signal input circuit 210. The superimposed voltage signal is input to a signal isolating circuit 220 through a lower limiter circuit 150, and the signal isolating circuit 220 isolatingly transmits the input superimposed voltage signal from the system side to the field side. Then, the superimposed voltage signal transmitted to the field side is converted into a superimposed current signal at a signal output circuit 230 and the superimposed current signal is output from the signal output circuit 230.

Figure 9:
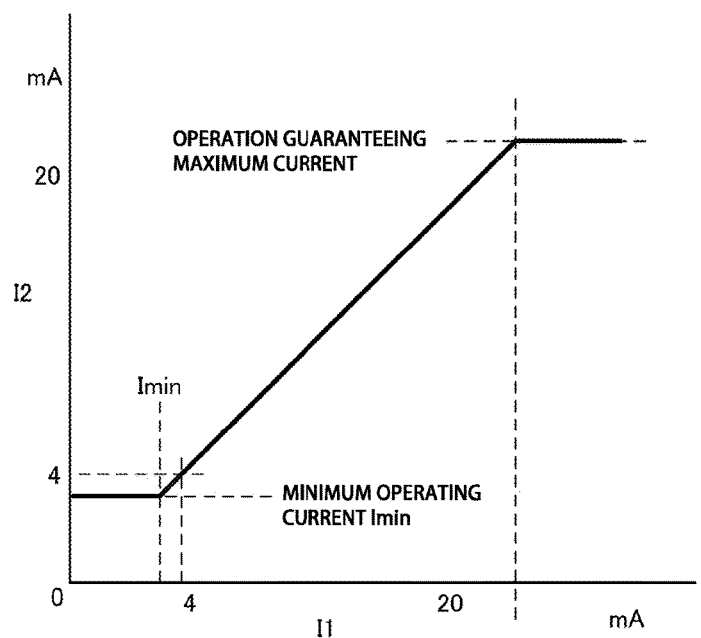
FIG. 9 is a diagram illustrating characteristics of an input current I1 and an output current I2 of an output isolator to which an upper limit function is added.
Figure 10:
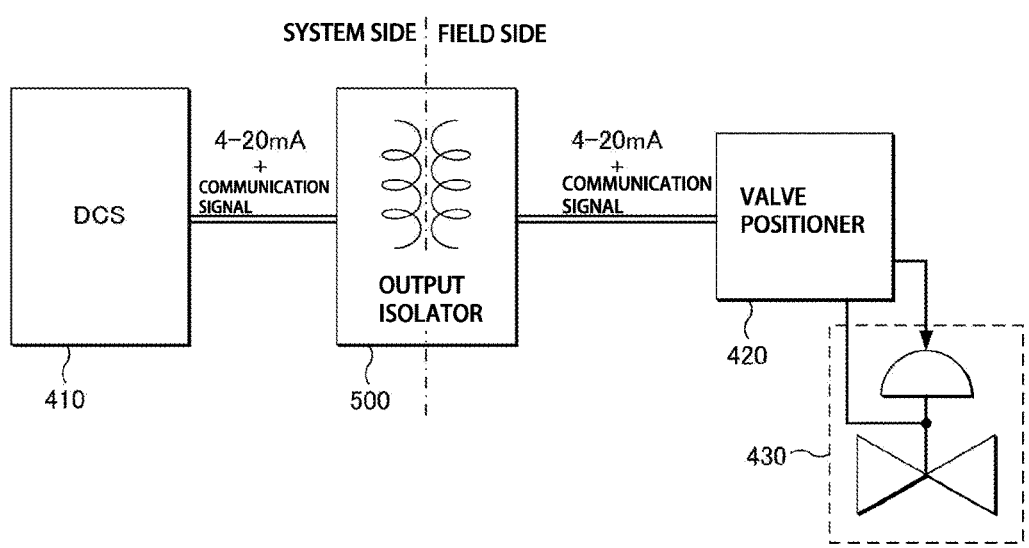
FIG. 10 is a block diagram illustrating an example of application of an isolated signal transmission apparatus that performs isolated transmission of a signal in the smart communication.
Figure 11:
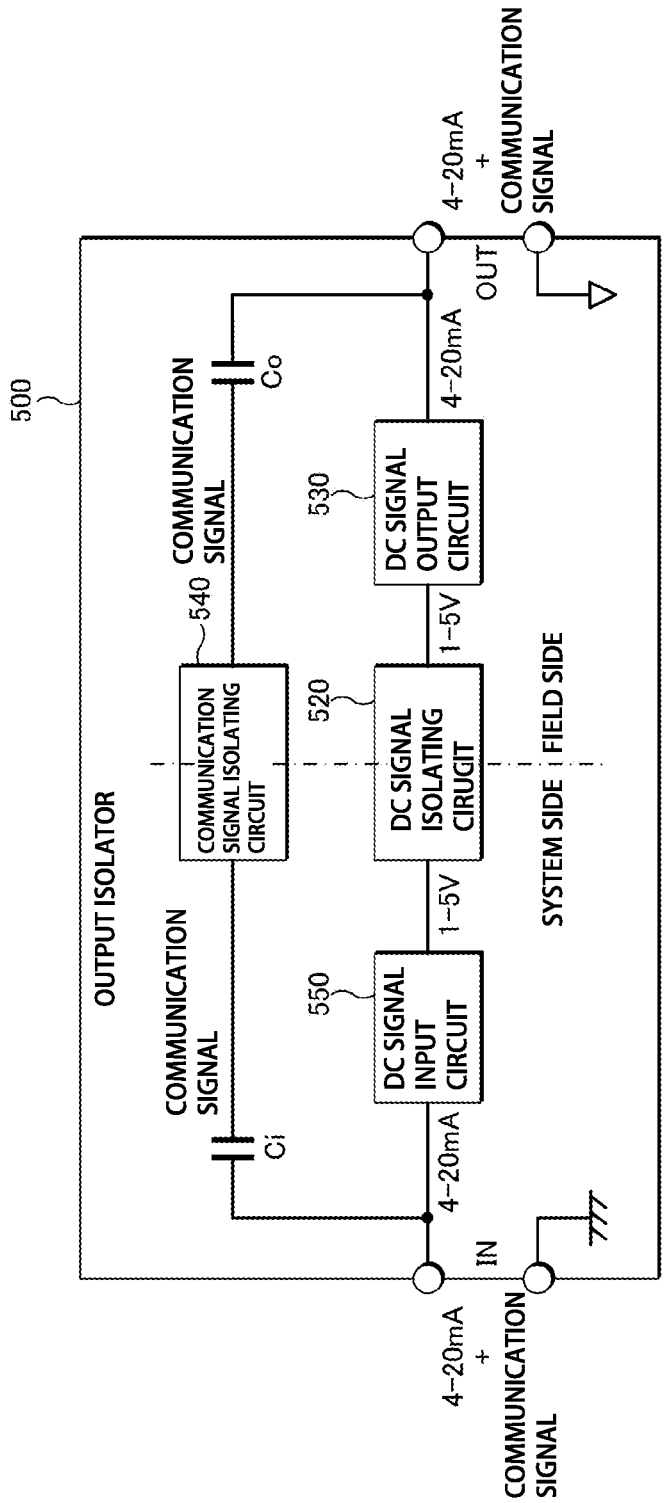
FIG. 11 is a block diagram illustrating a configuration of a related-art output isolator.
Figure 12:
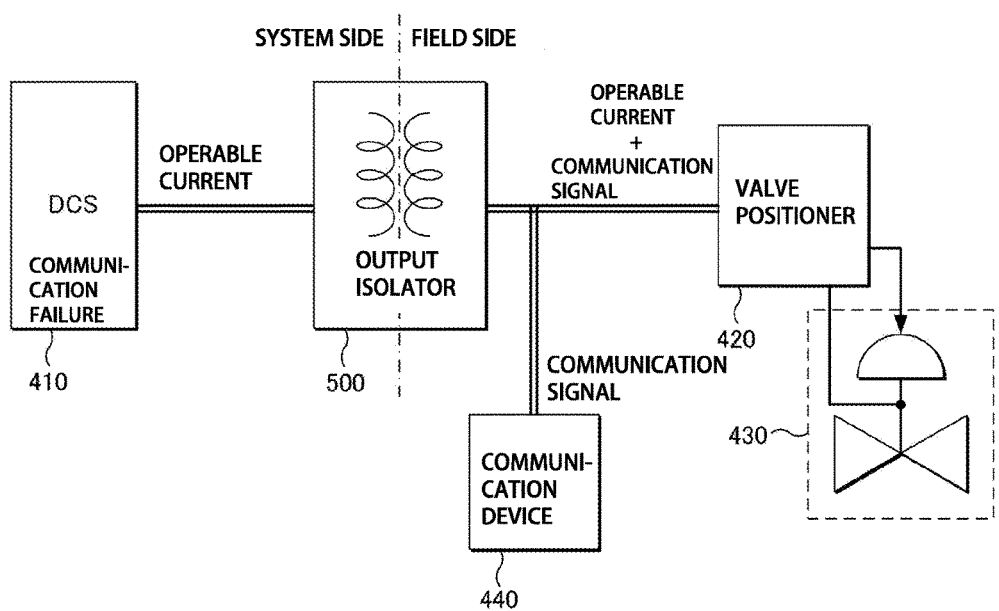
FIG. 12 is a diagram illustrating a configuration of operating a valve positioner using a communication device when DCS malfunctions.
Figure 13:
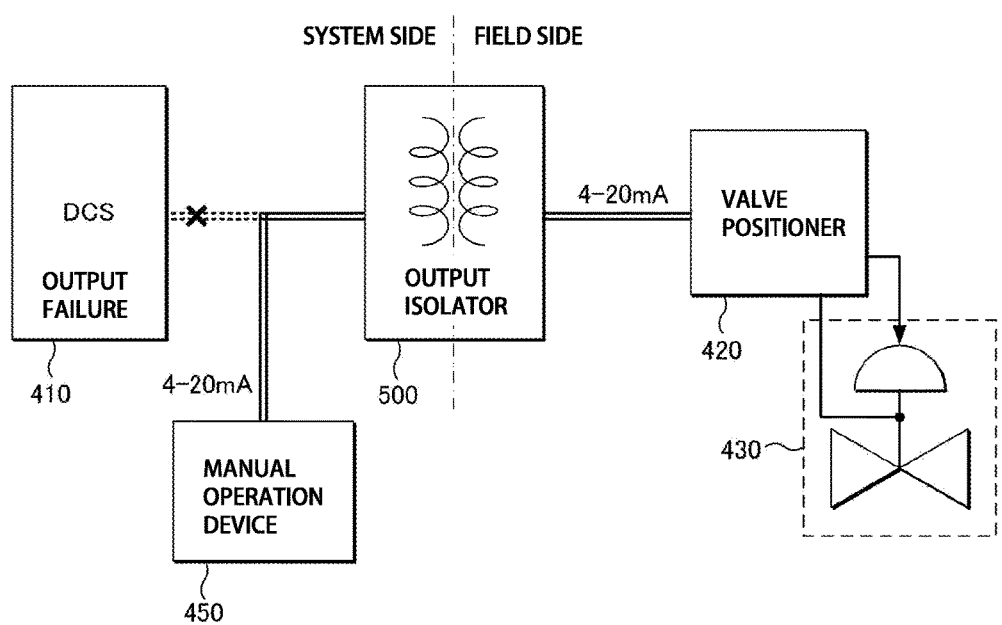
FIG. 13 is a diagram illustrating a configuration of operating a valve positioner using a manual operation device when DCS malfunctions.

Furthermore, in order to protect a control target apparatus from an overcurrent, an upper limit function of limiting the output voltage V2 up to an upper limit voltage Vmax may be added to the lower limiter circuit 150. Here, concerning the upper limit value Vmax, the value of the voltage V2, at which the value of the DC current signal I2 output by the direct-current signal output circuit 130 is an operation guaranteeing maximum current Imax of a control target apparatus, is set as the upper limit voltage value Vmax. In this case, the relationship between the input DC current signal I1 and the output DC current signal I2 of the output isolator 100 has such characteristics as illustrated in FIG. 9.

In addition, although the case of inputting from the control-side apparatus such as the DCS to the output isolator the electric signal obtained by superimposing the DC current signal of 4 to 20 mA and the communication signal on each other has been described in the above embodiment, the invention can be applied to the case of inputting, from the control-side apparatus such as the DCS to the output isolator, electric signal obtained by superimposing a DC voltage signal of 1 to 5 V and a communication signal on each other. In this case, it is advised to replace, with an input buffer, the direct-current signal input circuit 110 converting a DC current signal into a DC voltage signal.

What is claimed is:

1. An isolated signal transmission apparatus configured to isolatingly transmit, from a control-side apparatus to a control target apparatus, an electric signal obtained by superimposing a communication signal on a direct-current signal, said apparatus comprising:
   a lower limiter circuit configured to output, to the control target apparatus, a direct-current signal, whose value is a predetermined lower limit value, if a value of the direct-current signal from the control-side apparatus is less than the predetermined lower limit value.

2. The isolated signal transmission apparatus according to claim 1, wherein
   the control target apparatus uses the direct-current signal as a signal that supplies an operating power source; and
   the lower limit value is a minimum operating value of the control target apparatus.

3. The isolated signal transmission apparatus according to claim 1, wherein the direct-current signal is a DC current signal of 4 to 20 mA.

4. The isolated signal transmission apparatus according to claim 1, wherein
the lower limit limiter circuit has an upper limit function of outputting a direct-current signal whose value is the predetermined upper limit value if a value of the direct-current signal from the control-side apparatus excesses a predetermined upper limit value.

5. The isolated signal transmission apparatus according to claim 1, wherein the lower limiter circuit is configured to output, to the control target apparatus, a direct-current signal, whose value directly corresponds to the direct-current signal of the control-side apparatus, if the value of the direct-current signal from the control-side apparatus is equal to or higher than the predetermined lower limit value.

* * * * *